(12) United States Patent
Pap (10) Patent No.: US 10,718,502 B2
(45) Date of Patent: Jul. 21, 2020

(54) ILLUMINATED GUY ROPE SYSTEM

(71) Applicant: PUP GROUP PTY LTD, Niddrie (AU)

(72) Inventor: Paul Pap, Niddrie (AU)

(73) Assignee: PUP GROUP PTY LTD, Niddrie (AU)

( * ) Notice: Subject to any disclaimer, the term of this patent is extended or adjusted under 35 U.S.C. 154(b) by 0 days.

(21) Appl. No.: 16/083,658

(22) PCT Filed: Mar. 10, 2017

(86) PCT No.: PCT/AU2017/050219
§ 371 (c)(1),
(2) Date: Sep. 10, 2018

(87) PCT Pub. No.: WO2017/152241
PCT Pub. Date: Sep. 14, 2017

(65) Prior Publication Data
US 2019/0331329 A1    Oct. 31, 2019

(30) Foreign Application Priority Data

Mar. 10, 2016  (AU) ................................ 2016900906

(51) Int. Cl.
*F21V 23/04* (2006.01)
*E04H 15/32* (2006.01)
*E04H 12/20* (2006.01)
*F16G 11/00* (2006.01)
(Continued)

(52) U.S. Cl.
CPC ......... *F21V 23/0442* (2013.01); *E04H 15/32* (2013.01); *E04H 12/20* (2013.01); *F16G 11/00* (2013.01); *F21S 9/03* (2013.01); *F21W 2121/00* (2013.01)

(58) Field of Classification Search
CPC ..... F21V 23/0442; E04H 15/32; E04H 12/20; F21S 9/03; F21W 2121/00; F16G 11/00
See application file for complete search history.

(56) References Cited

U.S. PATENT DOCUMENTS 4,420,740 A    12/1983  Brown et al.
5,005,005 A *   4/1991  Brossia .................. B64D 15/20
                                                    250/573
(Continued)

FOREIGN PATENT DOCUMENTS

CN        1743724 A     3/2006
CN      105063884 A    11/2015
DE    202005015652 U1  12/2005

OTHER PUBLICATIONS

DE202005015652, machine translation (Year: 2005).*
International Search Report & Written Opinion dated Jun. 5, 2017 from corresponding PCT Application No. PCT/AU2017/050219.

*Primary Examiner* — Tracie Y Green
(74) *Attorney, Agent, or Firm* — Innovation Capital Law Group, LLP; Vic Lin (57) ABSTRACT

There is provided an illuminated guy rope system comprising: a light source assembly; a guy rope assembly operably fastened to the light source assembly wherein the guy rope assembly comprises at least one fibre-optic cable and wherein the light source assembly comprises a light source and an optic interface configured to shine light via the fibre-optic cable.

34 Claims, 7 Drawing Sheets

(51) Int. Cl.
*F21S 9/03* (2006.01)
*F21W 121/00* (2006.01)

(56) References Cited

U.S. PATENT DOCUMENTS

| | | | | |
|---|---|---|---|---|
| 5,333,228 | A * | 7/1994 | Kingstone | G02B 6/001 385/100 |
| 8,182,108 | B2 * | 5/2012 | Pearson | A01K 27/006 119/796 |
| 2004/0105278 | A1 * | 6/2004 | Currie | G02B 6/001 362/551 |
| 2011/0103757 | A1 * | 5/2011 | Alkemper | C03B 37/01211 385/124 |
| 2017/0315318 | A1 * | 11/2017 | Modavis | G02B 6/001 |
| 2018/0073490 | A1 * | 3/2018 | Li | H02N 11/006 |
| 2019/0110439 | A1 * | 4/2019 | Vilardi | A01K 27/006 |

* cited by examiner

ILLUMINATED GUY ROPE SYSTEM

FIELD OF THE INVENTION

The present invention relates to camping equipment and the like and in particular, but not necessarily entirely, to an illuminated guy rope system.

The invention has been developed primarily for use for camping and will be described hereinafter with reference to this application. However, it will be appreciated that the invention is not limited to this particular field of use. For example, the invention has other application also including for decorative purposes including for example, for Christmas decorations for application to window lintels, Christmas trees and the like.

BACKGROUND

Guy ropes are utilised for tying down tents, swags and other camping structures. Guy ropes however present trip hazards especially at night time.

A need therefore exists for a guy rope visible in low light situations. In this regard, prior art arrangements comprise glow-in-the-dark guy ropes. However, these glow-in-the-dark guy ropes lose luminosity quickly so as to only be useful for a short period after sunset.

As such, present embodiments are deficient in several respects.

The present invention seeks to provide a system, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

In accordance with one aspect, there is provided illuminated guy rope system comprising: a light source assembly; a guy rope assembly operably fastened to the light source assembly wherein the guy rope assembly comprises at least one fibre-optic cable and wherein the light source assembly comprises a light source and an optic interface configured to shine light via the fibre-optic cable.

The fibre-optic cable may be a side emitting fibre-optic cable.

The fibre-optic cable may comprise a plurality of twisted polymer fibres.

The twisted fibres have a diameter of about 0.75 mm.

The illuminated guy rope system may further comprise an internal reflective PVC core and wherein the polymer fibres are twisted around the PVC core.

The illuminated guy rope system may further comprise a transparent sheath around the fibre-optic cable.

The guy rope assembly may comprise a tensioning rope material and wherein the guy rope assembly may be configured such that the tensioning rope material takes most strain when the guy rope assembly may be put under tension.

The tensioning rope material may comprise twisted cores and wherein fibre-optic cable may be one of the twisted cores.

The tensioning rope material may comprise twisted cores and wherein the fibre-optic cable may be wrapped around the twisted cores.

The light source assembly may comprise a housing and wherein the housing may comprise an entrance port for the guy rope assembly.

The housing may comprise a lower surface and an upper surface and wherein the port may be located towards the upper surface such that the centre of gravity of the housing causes the housing to swing to the orientation wherein the upper surface faces upright.

The light source assembly may comprise a housing and wherein the housing may comprise a connector for fastening the housing to a structure in use and wherein the connector may be located towards the upper surface such that the centre of gravity of the housing causes the housing to swing to the orientation wherein the upper surface faces upright.

The illuminated guy rope system may further comprise a solar panel and a rechargeable battery supply and wherein during daylight hours, the solar panel charges the rechargeable battery supply and wherein, during nighttime hours, the rechargeable battery supply powers the light source.

The light source assembly may be configured for measuring the ambient light levels in accordance with the voltage levels output by the solar panel and for controlling the light source when the ambient light levels of full beneath a threshold.

The light source assembly may be configured for controlling the illumination of the light source.

The light source assembly may be configured for measuring ambient light levels and wherein the light source assembly may be configured for illuminating the light source when ambient light levels falls beneath a threshold.

The light source assembly may comprise a light sensor.

The light source assembly may be configured for detecting object proximity and wherein the light source assembly may be configured for illuminating the light source when a proximate object may be detected.

The light source assembly may comprise a proximity detector.

The proximity detector may comprise a passive infrared detector.

The proximity detector may comprise an ultrasonic detector.

The light source assembly may be configured for detecting motion of the light source assembly and illuminating the light source when motion may be detected.

The light source assembly may comprise a motion sensor and wherein the light source assembly may be configured for illuminating the light source when the motion sensor sensors motion.

The motion sensor may comprise an accelerometer.

There is also provided a light source assembly for an illuminated guy rope system, the light source assembly comprising a light source and an optic interface adjacent the light source wherein the optic interface is configured for receipt of a distal end of a fibre-optic containing guy rope assembly therethrough in use.

The optic interface may comprise an entrance port.

The light source assembly may comprise an upper surface and a lower surface and wherein the port may be located towards the upper surface.

The light source assembly may further comprise a connector opposite the port and wherein the connector may be located towards the upper surface.

The optic interface may comprise frictional engagement for engaging at least a portion of the guy rope assembly.

The frictional engagement may comprise teeth.

The frictional engagement may comprise teeth located within the port.

The frictional engagement may comprise transverse abutments adjacent the port.

The transverse abutments comprise teeth.

The optic interface may be configured for the separation of the fibre-optic from the remainder of the illuminated guy rope system.

The optic interface may comprise a lateral offramp for laterally accommodating the remainder of the illuminated guy rope assembly.

The light source assembly may further comprise a terminal connector at a terminus of the lateral offramp for securing a distal end of the remainder of the illuminated guy rope assembly.

The terminal connector may comprise a screw pier and mating screw.

The light source assembly may further comprise a PCB engagement and wherein the PCB engagement may be configured so as to locate the PCB such that a light source of the PCB faces and operably collocates with the optic interface.

The optic interface may comprise a light port for operably collocating with the light source of the PCB.

The PCB engagement may comprise a pair of vertical PCB slots.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

Before the structures, systems and associated methods relating to the illuminated guy rope system are disclosed and described, it is to be understood that this disclosure is not limited to the particular configurations, process steps, and materials disclosed herein as such may vary somewhat. It is also to be understood that the terminology employed herein is used for the purpose of describing particular embodiments only and is not intended to be limiting since the scope of the disclosure will be limited only by the claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterised by," and grammatical equivalents thereof are inclusive or open-ended terms that do not exclude additional, unrecited elements or method steps.

It should be noted in the following description that like or the same reference numerals in different embodiments denote the same or similar features.

In the accompanying illustrations, there is provided an illuminated guy rope system 1. As will be described in further detail below, the guy rope system 1 provides illuminated guy ropes visible in low light situations.

Figure 3:
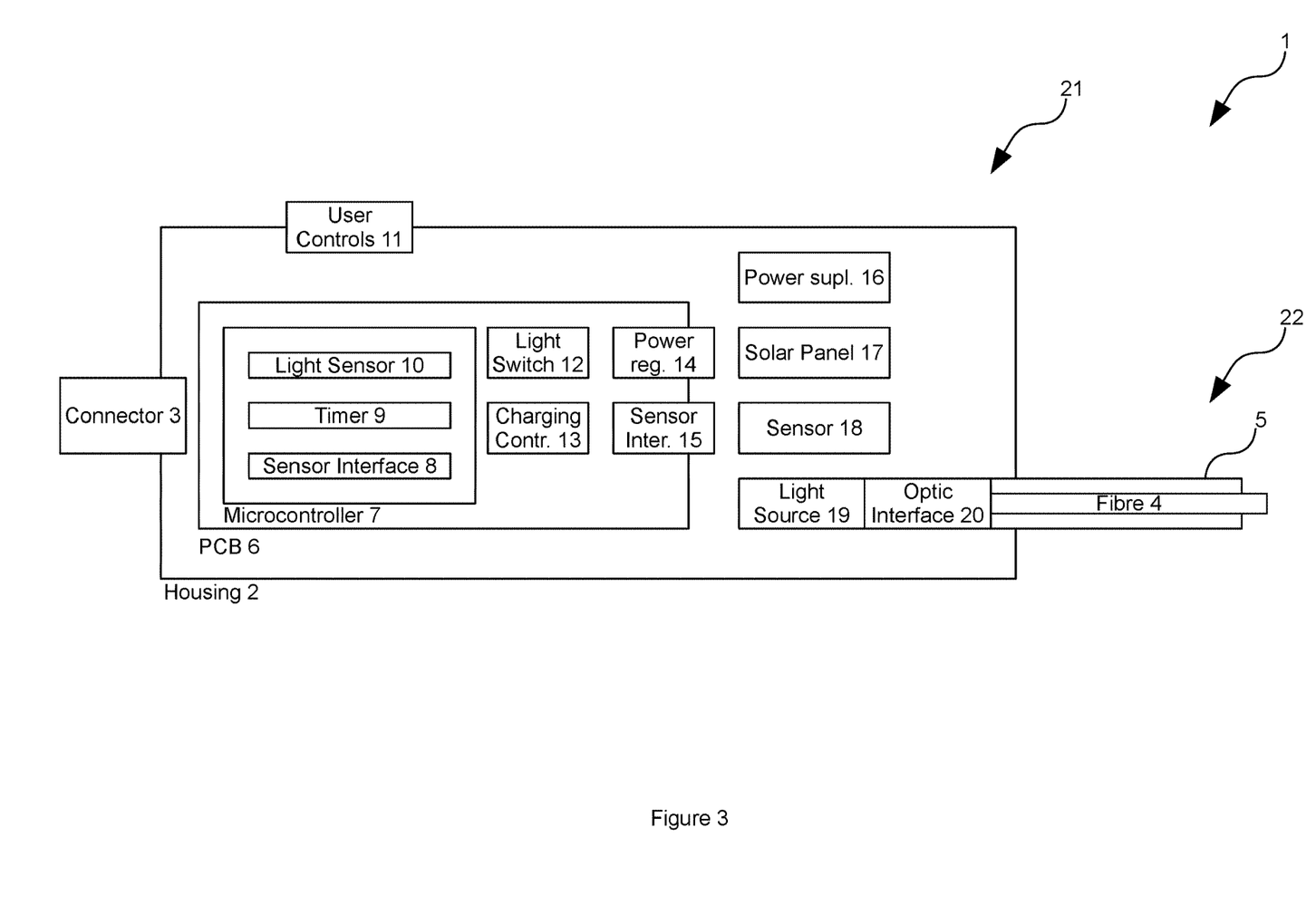
FIG. 3 shows a functional schematic of the illuminated guy rope system in accordance with an embodiment of the present disclosure.

Specifically, turning to FIG. 3, there is shown a functional schematic of the illuminated guy rope system 1. As can be seen, the guy rope system 1 comprises a light source assembly 21 and a guy rope assembly 22. The guy rope assembly 22 is operably fastened to the light source assembly 21 so as to illuminate the guy rope assembly 22 in the manner described herein.

Specifically, the guy rope assembly 22 comprises at least one fibre-optic cable 4. The light source assembly 21 comprises a light source 19 and an optic interface 22 cooperating with the light source 22 to shine light through the fibre-optic cable 4.

Different light sources 10 may be utilised within the purpose of scope of these embodiments including LED and laser diode light sources. In embodiments, different colour light sources may be utilised so as to allow the user to select an appropriate illumination colouring, such as white light for the front of a tent and red light for the rear of the tent.

In a preferred embodiment, the fibre optic cable 4 is a side emitting fibre-optic cable 4 so as to spill light laterally with respect to the guy rope assembly 22 so as to be visible in use in low light situations.

In one embodiment, the fibre-optic cable 4 may comprise a plurality of polymer fibres, such as 0.75 mm polymer fibres twisted within a clear jacket or sheath. In this manner, light spilling laterally from the polymer fibres is visible through the clear jacket or sheath. In further embodiments, the polymer fibres may be twisted around a reflective internal PVC core so as to maximise lateral light output.

In embodiments, the guy rope assembly 22 may comprise a fibre-optic cable 4 component and a tensioning rope material 5 component such that the tensioning rope material 5 is able to take most or all of the strain when tension is applied to the guy rope assembly 22 whereas the fibre-optic cable 4 is substantially untensioned while providing the illumination properties thereof.

Figure 2A:
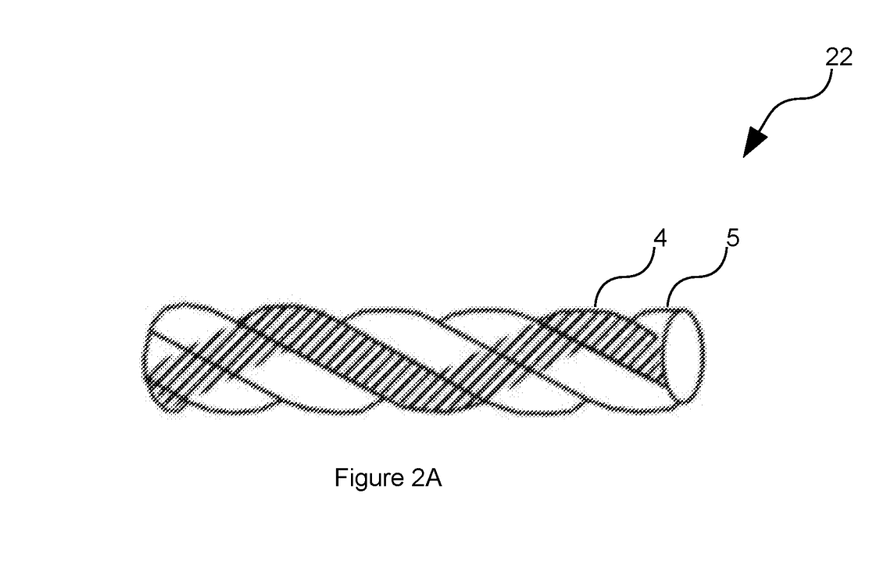
FIG. 2 shows illuminated guy rope assemblies in accordance with embodiments of the present disclosure.
Figure 2B:
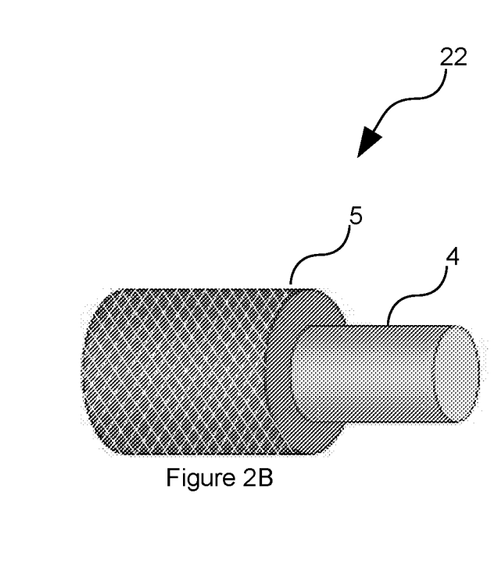

Turning to FIG. 2, there is shown embodiments of the guy rope assembly 22. Specifically, FIG. 2B shows the guy rope assembly 22 comprising the central fibre-optic cable 4 surrounded by a cylindrical sheath of the tensioning rope material 5.

In this embodiment, the tensioning rope material 5 may be transparent or substantially transparent or, in the alternative embodiments, woven so as to leave gaps therein through which light may spill laterally from the interior fibre-optic cable 4.

In the embodiment shown in FIG. 2B the cylindrical sheath 5 is a woven "paracord" type material through which light from the fibre-optic cable 4 emanates.

In the embodiment shown in FIG. 2B the fibre-optic cable 4 is a monofilament.

In embodiments, the monofilament core 4 may have a diameter of about 3 mm and the cylindrical sheath 5 have an external diameter of 3.2 mm.

In embodiments, the core 4 may be spliced or pared from the sheath 5, or the core 4 inserted laterally through the side of the sheath so as to separate the core 4 from the sheath 5 at a distal end of the guy rope assembly 4 so as to be suited to be retained within the optic interface 20 as is substantially shown in the exemplary embodiments provided in FIG. 4-7.

However, turning to FIG. 2A, there is shown the guy rope assembly 22 comprising twisted or interwoven tensioning rope material.

However, the guy rope assembly 22 is characterised in comprising the side emitting fibre-optic cable 4 woven therein.

In one embodiment, whereas the guy rope assembly 22 comprises a plurality of twisted cores, the fibre-optic cable 4 may constitute one of the twisted cores so as to be incorporated during the manufacture of the guy rope assembly 22. However, in other embodiments, the fibre-optic cable 4 may be spiraled around the exterior of the guy rope assembly 22.

In further embodiments, the system 1 may be provided comprising the fibre-optic cable only for retrofit to existing guy ropes wherein, for those existing guy ropes, the fibre-optic cable may be wrapped around the existing guy ropes.

In embodiments, the tensioning rope material 5 may comprise one of paracord or twisted or woven rope material.

Turning again to the functional schematic of the illuminated guy rope system 1 of FIG. 3, further features and functionality of the system 1 will now be described. Specifically, in particular embodiments, the light source assembly 21 may be borne within a housing 2, such as a small form factor plastic weatherproof housing.

In a preferred embodiment, the light source assembly 21 is solar powered and therefore comprises a solar panel 17. As such, when camping, the light source assembly 21 may be recharged for later utilisation that night. In this way, the light source assembly 21 may negate the need for replacement of batteries and the like.

It should be noted that other regenerative/recharging means are envisaged within the purpose of scope of the embodiments ascribed the rent wherein, for example, alternative embodiments may comprise a dynamo which, for example, is connected to an impeller which turns when drawn through water, such as having an application for boating or alternatively is operably connected to the guy rope assembly 22 such that the light source assembly 21 is able to be recharged by running the housing 2 up and down the guy rope assembly 22.

In this regard, the light source assembly 21 may further comprise a power supply 16, which, in this embodiment, takes the form of a rechargeable battery supply operably coupled to the solar panel 17. As such, during daylight hours, the solar panel 17 recharges the power supply 16 such that the light source assembly 21 is able to draw power therefrom when dark.

In further embodiments, the light source assembly 21 may comprise a PCB 6 comprising the various requisite electronics thereon. In embodiments, the PCB 6 may implement analogue electronics but, in one embodiment, the PCB 6 may comprise a digital microcontroller 7 configured to perform additional functionality.

The PCB 6 may comprise a power regulator 14 for the purposes of drawing power from the power supply 16. Furthermore, in embodiments, the PCB 6 may comprise a charging controller 13 configured to control the charging of the power supply 16 from the power output of the solar panel 17 wherein the charging controller 13 is configured for adjusting the requisite voltage and current levels and charging duration times for properly charging the power supply 16.

Furthermore, the PCB 6 may comprise a light switch 2 configured to selectively control power to the light source 19. In further embodiments, the PCB 6 may be operably coupled to user controls 11, wherein, in embodiments, the user controls 11 comprise a pushbutton switch.

As such, the pushbutton switch may be utilised for the light switch 12 such that the user is able to selectively provide power to the light source 19. In further embodiments, the user controls 11 may be configured for other functionality including for changing the light colouring of the light source 19 in embodiments.

However, in a preferred embodiment, the light source assembly 21 is configured for automatically illuminating the light source 19 when required.

In this regard, the PCB 6 may sense the voltage levels received from solar panel 17 so as to ascertain when darkness falls so as to then illuminate the light source 19. In embodiments, the PCB 6 may comprise a timer circuit so as to allow for a certain period of time prior to illuminating the light source 19 after dusk.

However, in other embodiments, the light source assembly 1 may comprise a sensor 18 configured to sense light levels. In this regard, the PCB 6 may comprise a sensor interface 15 so as to be able to receive the sensor readings from the light level sensor 18 so as to be able to ascertain when to provide power to the light source 19.

In embodiments, wherein the light source assembly 21 utilises a microcontroller 7, the microcontroller 7 may comprise computer program code configured for controlling the operation of the microcontroller 7 including comprising various constituent computer program modules including those represented in FIG. 3.

In this regard, the microcontroller 7 may comprise a light sensor module 10 configured to read the light level readings from the sensor 8 (such as by utilising an analogue to digital conversion input part of the microcontroller 7) so as to be able to control a digital output of the microcontroller 7 for controlling the light switch 12 to power the light source 19.

In further embodiments, the microcontroller 7 may comprise a timing control module 9 configured to implement various timing functionality. Specifically, as alluded to above, the timing module 9 may be configured to wait a period of time after dusk prior to illuminating the light source 19.

In alternative embodiments the timer module 9 may illuminate the light source 19 for a predetermined time period only, such as for a period of four hours after sunset. In further embodiments, the timer module 9 may comprise a clock so as to be able to, for example, only illuminate the light source 19 during predetermined hours of the night.

Furthermore, the software modules may further comprise a sensor interface 8 configured to read and act on the sensor levels received from the sensor 18.

As such, the manner described above, the light source assembly 21 may be configured for sensing ambient light level so as to automatically control the illumination of the light source 19.

However, in further embodiments the light source assembly 21 may be configured for sensing other inputs for the purposes of controlling the light source 19 when required. For example, in one embodiment, the PCB 6 may comprise an motion sensor, such as an accelerometer, Mercury switch or the like so as to be able to detect motion of the light source assembly 21 such as where, for example, a person were to brush against or trip over the guy rope assembly 22, so as to allow the light source assembly 21 to illuminate the guy rope assembly 22.

In further embodiments, the sensor 18 may comprise a motion or proximity detector such as passive infrared sensor so as to be able to detect motion so as to be able to automatically illuminate the light source 19 as a person approaches the guy rope assembly 22. Other proximity sensors may be utilised also, including ultrasonic proximity sensors and the like.

In further embodiments, the sensor 18 may comprise a microphone so as to be able to detect noise indicative of a person being proximate the guy rope assembly.

In further embodiments, the light source assembly 22 may comprise a wireless interface, such as a radiofrequency receiver so as to be able to allow for the remote control of the light source assembly, such as by utilising a garage type remote controller device, mobile phone device or the like.

Figure 1:
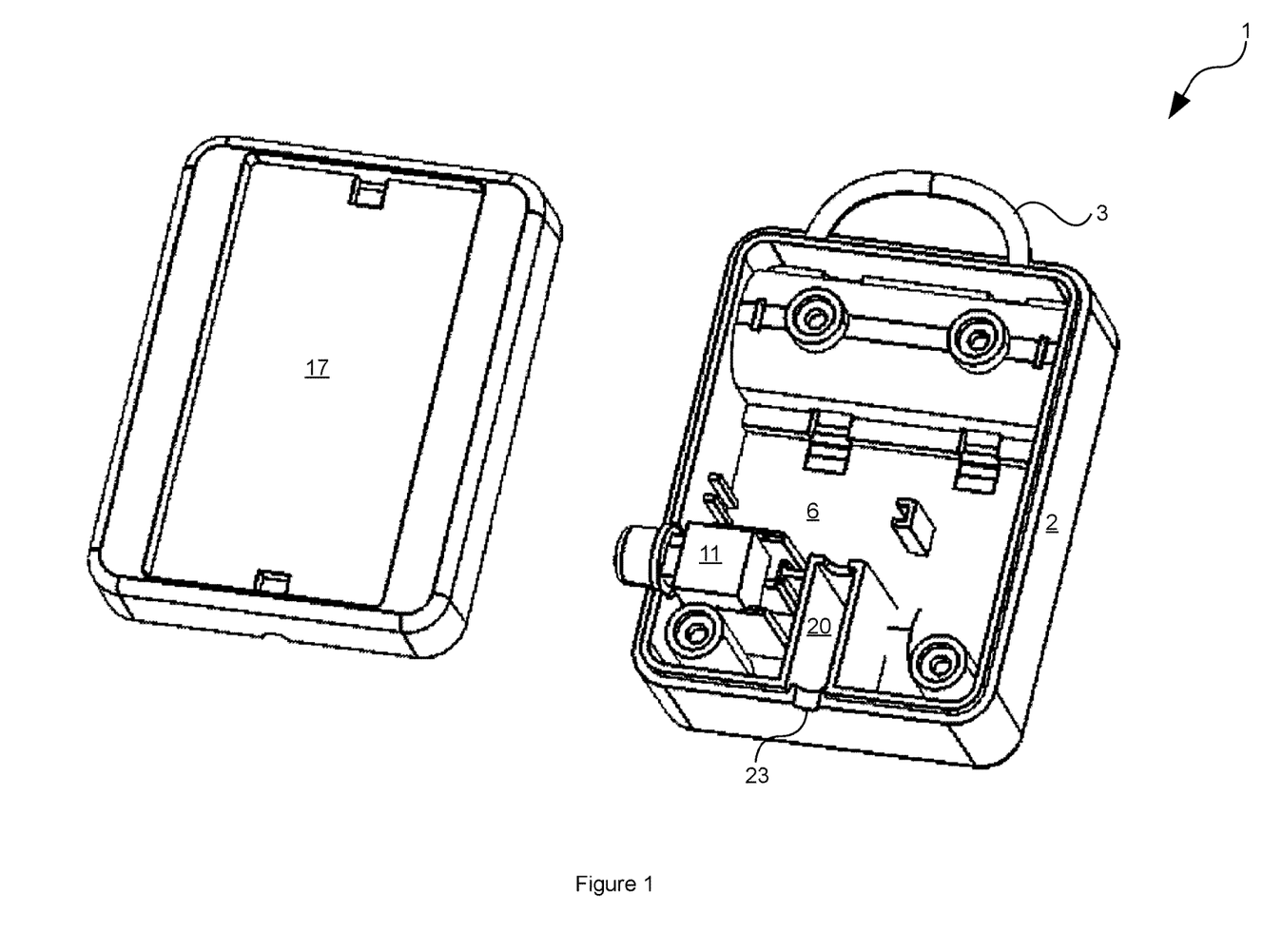
FIG. 1 shows the physical construction of the housing of an illuminated guy rope system in accordance with an embodiment of the present disclosure.

Turning now to FIG. 1, there is shown the physical construction of the housing 2 in accordance with an embodiment. Specifically, as can be seen, the housing 2 is substantially rectangular and small form factor. Preferably the housing is substantially water tight.

Furthermore, the housing 2 comprises a base portion and a lid which are screwed together utilising screws. In the embodiment shown in FIG. 1, there is shown the lid removed.

Now, the surface of the lid may comprise the solar panel 17. As can be seen, the solar panel 17 occupies substantially entire upper surface of the lid so as to maximise the incident light full thereon.

Furthermore, the housing 2 may be held in place by upper ring connector 3 which would generally be fastened to a portion of the tent or camping structure.

The opposite bottom side of the housing 2 comprises a port 23 through which the guy rope assembly 22 enters the housing 2.

As can be seen, interior the port 23, the housing 2 comprises the optic interface 20 shown as the elongated channel in the embodiment shown. In embodiments, the interior of the optic interface 20 may comprise a frictional engagement or clamping mechanism, such as one comprising teeth or the like so as to engage the guy rope assembly 22 within the optic interface 20 without substantially affecting the light propagation properties thereof.

In a preferred configuration, the housing 2 is located towards the tent or camping structure, such as by being fastened to a tent flap or the like wherein the guy rope assembly 22 then leads from the port 2 down to a tent peg or the like and back up to a fastening point, such as a tensioning slider or other suitable arrangement.

In this embodiment, the tensioning slider may be configured so as to not unnecessarily abrade the fibre-optic of the guy rope assembly 22 such as by comprising a smoothened rope interface. Furthermore, the tent peg utilised may comprise a rounded neck so as to allow light within the fibre-optic to transition the bend gradually so as to be able to also illuminate the upward leg of the fibre-optic cable 4.

Now, in a preferred embodiment, the port 23 may be located towards the lid that is, above the lateral centreline of the housing 22 such that the centre of gravity of the housing 2 is beneath the port 23 such that the housing 2 naturally swings to the orientation having the solar panel 17 facing upwards.

As is shown, the base of the housing 22 comprises vertical slots 6 into which the PCB 6 may be inserted. The light source 19, such as the LED or the like may be located on the PCB 6 so as to co-locate and be orientated towards the optic interface 20 channel so as to be able to shine light down the fibre-optic cable. In embodiments, the fibre optic cable 4 may comprise an optical termination sheath or the like which is mechanically fastened to the light source 19 of the PCB 6 so as to ensure light transmission therethrough.

As a further shown, the housing 2 may make allowance for the user controls 11 which, in the embodiment shown, may comprise a user pushbutton.

Turning now to FIGS. 4-7, there is shown various views of the housing 2 in accordance with an embodiment.

Figure 4:
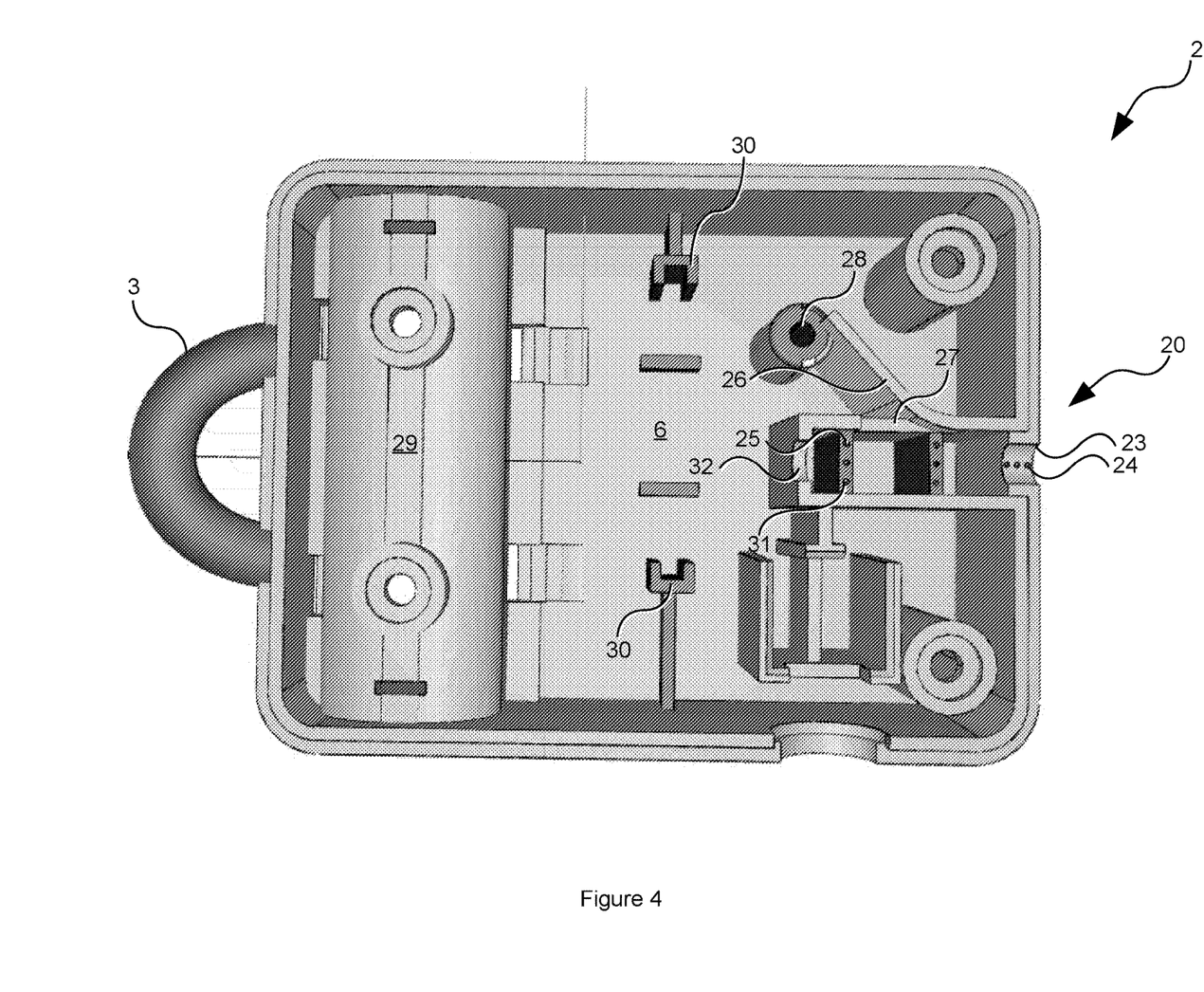
FIGS. 4-7 show various views of a light source housing of the system in accordance with an embodiment.

Specifically, FIG. 4 shows the base of the housing 2 with the lid having been removed.

The housing 2 comprises 4 screw piers for receiving screw fasteners therethrough for fastening the lid to the base.

As is also shown, the housing 2 comprises a semicylindrical battery compartment 29 recessed within the interior of the housing 2 such that the housing 2 retains a substantially rectangular shape.

Figure 5:
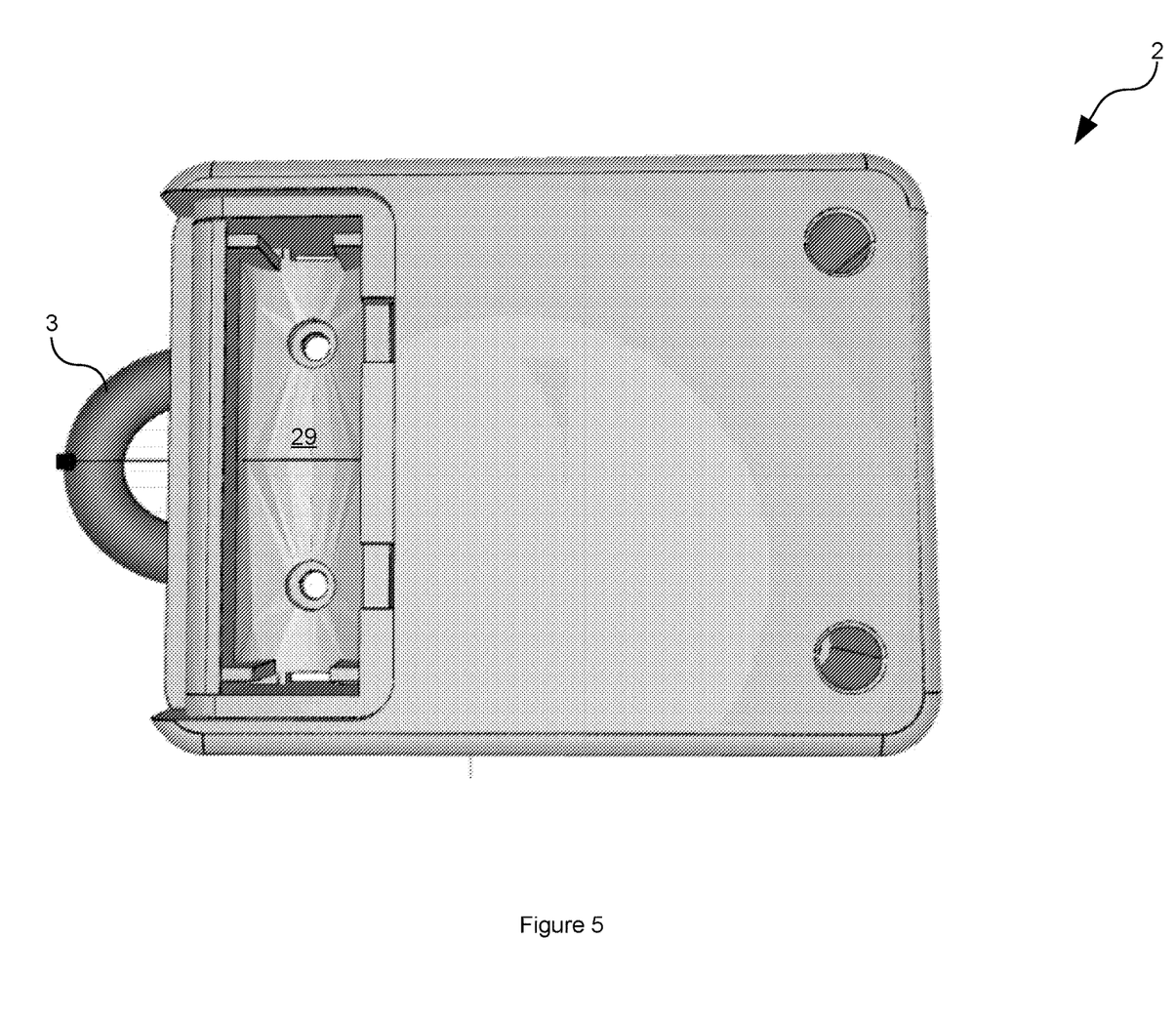

FIG. 5 shows the rear of the housing 2 illustrating the open battery compartment 29 into which a penlight battery may be inserted in use. The battery compartment 29 comprises a lid (not shown) which clips into the pair of recesses provided for securement.

The interior of the housing 2 further comprises a pair of vertical slots 30 into which the planar PCB 6 may be inserted. The vertical slots 30 may be supported by horizontal struts and the PCB 6 offset from the floor of the housing 2 by the pair of stand-offs provided.

Adjacent the PCB 6 is the optic interface 20 defining a channel for the distal end of the light rope assembly 22.

As can be seen, the optic interface 20 comprises the port 23 through which the light rope assembly 22 enters the housing 2.

Inside the housing 2, the light rope 22, or at least a portion thereof may be held in place by way of fictional engagement. Specifically, as can be seen, the port 23 may comprise a series of teeth 24 that bear against and fractionally engage the light rope 22 when the lid is attached to the base.

Furthermore, the optic interface 20 may comprise a pair of transverse abutments 31 also comprising teeth 25 thereon so as to further enhance the frictional engagement of the light rope 22 or a portion thereof.

Now, in a preferred embodiment, the optic fibre 4 may be separated from the sheath/tensioning rope material 5 within the housing.

The sheath 5 exits the optic interface 20 via the lateral aperture 27 and across offramp 26 to terminate at screw pier 28 and wherein the sheath 5 is fastened to the screw pier 28 by way of a screw screwed into the screw pier 28.

As such, the attachment of the sheath 5 to the screw pier 28 and the frictional engagement provided by the teeth 24, 25 substantially prevent the light rope assembly 22 from being pulled from the optic interface 20.

Now, the optic fibre 4, having been separated from the sheath 5 continues to travel along the channel of the optic interface 20 so as to face opposite light port 32 so as to be able to receive or light from an adjacent light source 19.

Specifically, the light source 19, such as an LED or the like may be positioned on the PCB 6 such that as the PCB 6 is positioned within the vertical slots 30, the light source 19 faces towards and collocates with the light port 32 such that light shines through the light port 32 and into the distal end of the optic fibre 4.

In embodiments, the distal end of the optic fibre 4 may be provided with a transparent or hollow sheath or the like so as to correctly position the distal end of the optic fibre 4 with respect to the light port 32.

Figure 6:
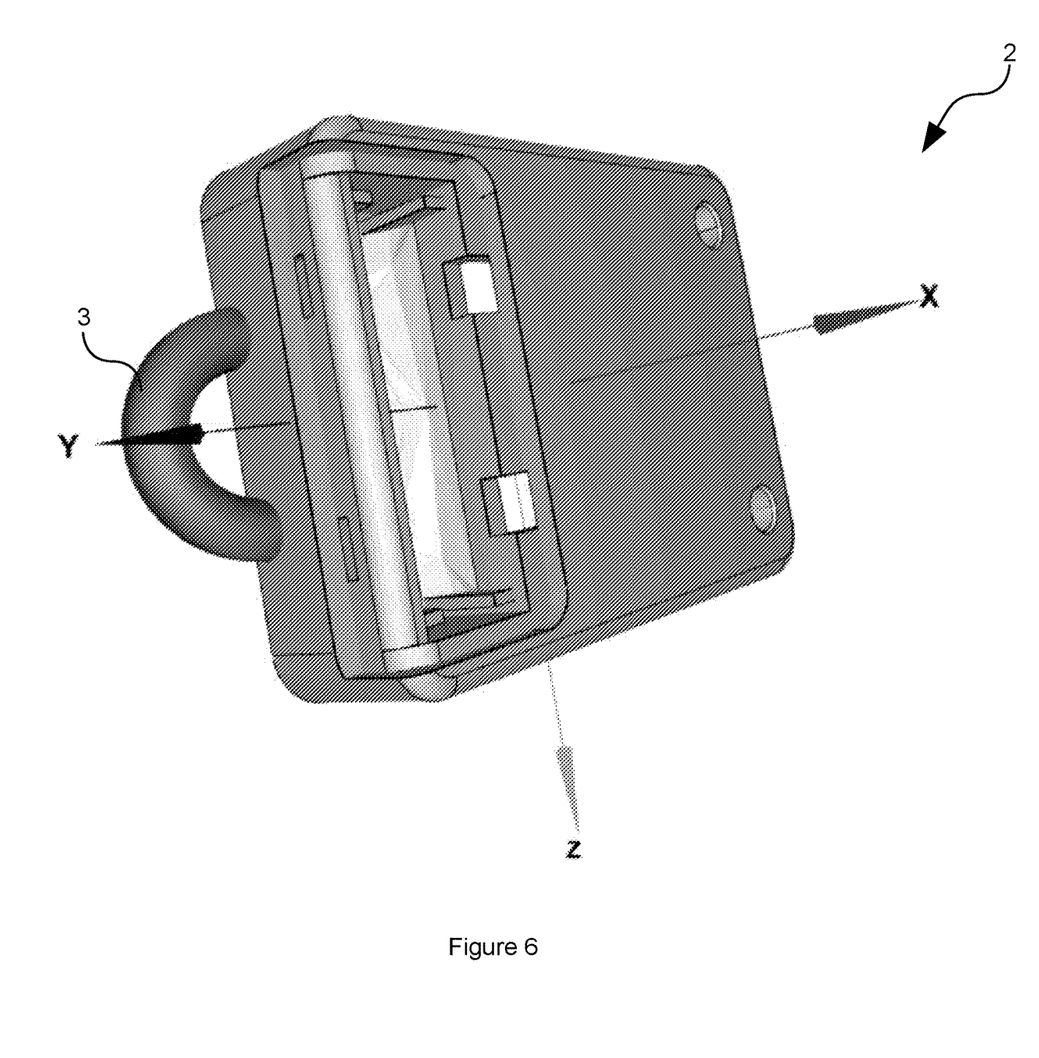

Turning to FIG. 6, there is shown a rear side perspective view of the housing 2. As can be seen, the ring connector 3 is located towards the upper of the housing 2 such that, and as alluded to above, the housing 2 naturally swings to the upright orientation being advantageous for collection of light where the housing 2 comprises a solar panel.

Figure 7:
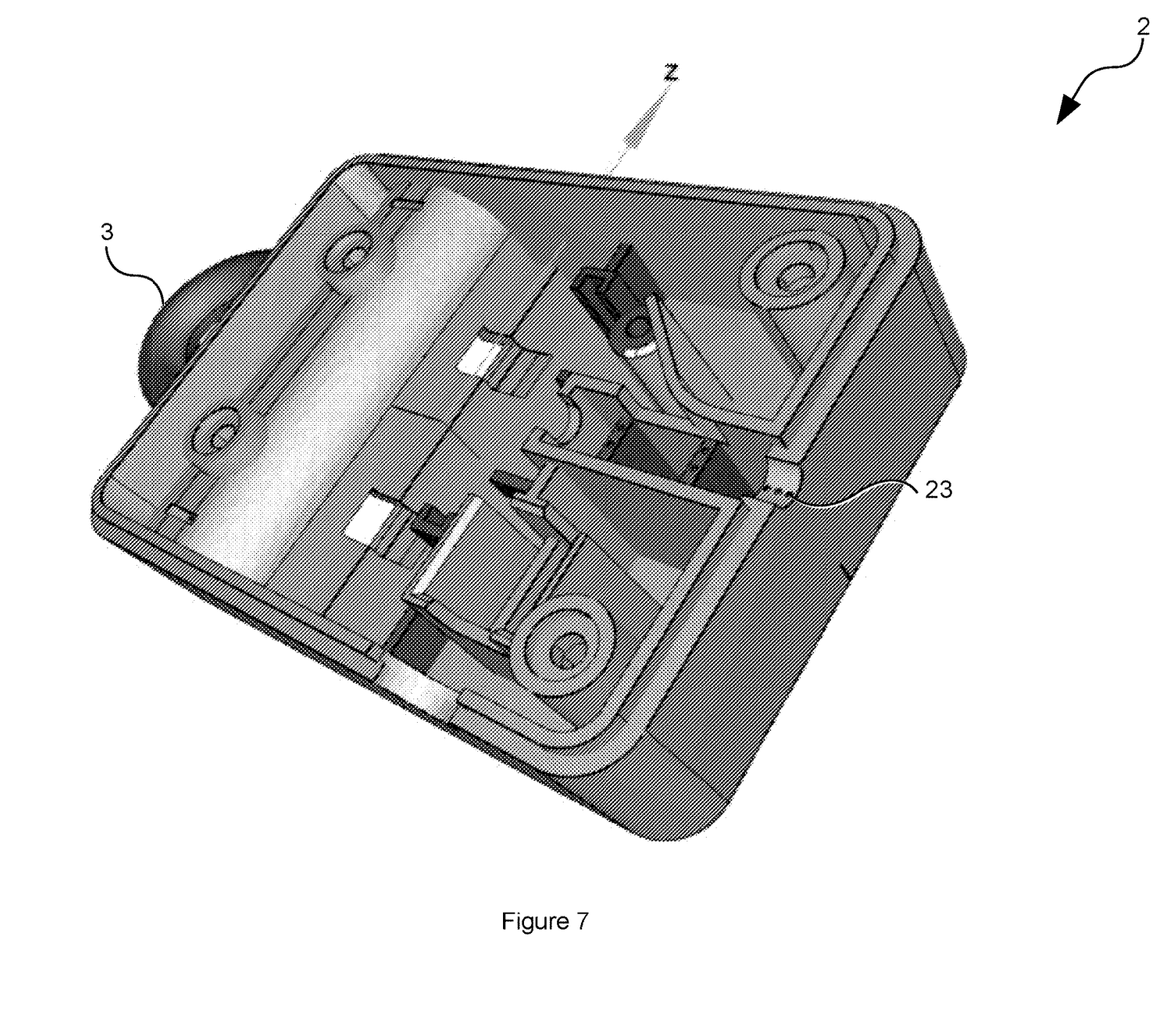

Similarly, as is shown in FIG. 7, the port 23 is also located towards the upper of the housing such that the housing naturally swings to the upright orientation.

Interpretation

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the camping and/or decorative equipment industry.

The invention claimed is:

1. An illuminated guy rope system comprising:
a light source assembly comprising a housing;
a guy rope assembly operably fastened to the light source assembly wherein the guy rope assembly comprises at least one fibre-optic cable and wherein the light source assembly comprises a light source and an optic interface configured to shine light via the fibre-optic cable, wherein the fibre-optic cable is a side emitting fibre-optic cable, and wherein the optic interface is configured for the separation of the fibre-optic cable from a remainder of the illuminated guy rope system;
a lateral offramp for laterally accommodating the remainder of the illuminated guy rope assembly; and
a terminal connector at a terminus of the lateral offramp for securing a distal end of the remainder of the illuminated guy rope assembly, wherein
the housing comprises an entrance port for the guy rope assembly and a connector for fastening the housing to a structure in use; and
the optic interface maintains the fibre-optic cable in a linear configuration within the housing.

2. The illuminated guy rope system as claimed in claim 1, wherein the fibre-optic cable comprises a plurality of twisted polymer fibres.

3. The illuminated guy rope system as claimed in claim 2, wherein the twisted fibres have a diameter of about 0.75 mm.

4. The illuminated guy rope system as claimed in claim 2, further comprising an internal reflective PVC core and wherein the polymer fibres are twisted around the PVC core.

5. The illuminated guy rope system as claimed in claim 2, further comprising a transparent sheath around the fibre-optic cable.

6. The illuminated guy rope system as claimed in claim 1, wherein the guy rope assembly comprises a tensioning rope material and wherein the guy rope assembly is configured such that the tensioning rope material takes most strain when the guy rope assembly is put under tension.

7. The illuminated guy rope system as claimed in claim 6, wherein the tensioning rope material comprises twisted cores and wherein fibre-optic cable is one of the twisted cores.

8. The illuminated guy rope system as claimed in claim 6, wherein the tensioning rope material comprises twisted cores and wherein the fibre-optic cable is wrapped around the twisted cores.

9. The illuminated guy rope system as claimed in claim 1, wherein the housing comprises a lower surface and an upper surface and wherein the port is located towards the upper surface such that the centre of gravity of the housing causes the housing to swing to the orientation wherein the upper surface faces upright.

10. The illuminated guy rope system as claimed in claim 1, wherein the connector is located towards the upper surface such that the centre of gravity of the housing causes the housing to swing to the orientation wherein the upper surface faces upright.

11. The illuminated guy rope system as claimed in claim 1, further comprising a solar panel and a rechargeable battery supply and wherein during daylight hours, the solar panel charges the rechargeable battery supply and wherein, during nighttime hours, the rechargeable battery supply powers the light source.

12. The illuminated guy rope system as claimed in claim 11, wherein the light source assembly is configured for measuring the ambient light levels in accordance with the voltage levels output by the solar panel and for controlling the light source when the ambient light levels of full beneath a threshold.

13. The illuminated guy rope system as claimed in claim 1, wherein the light source assembly is configured for controlling the illumination of the light source.

14. The illuminated guy rope system as claimed in claim 13, wherein the light source assembly is configured for measuring ambient light levels and wherein the light source assembly is configured for illuminating the light source when ambient light levels falls beneath a threshold.

15. The illuminated guy rope system as claimed in claim 14, wherein the light source assembly comprises a light sensor.

16. The illuminated guy rope system as claimed in claim 13, wherein the light source assembly is configured for detecting object proximity and wherein the light source assembly is configured for illuminating the light source when a proximate object is detected.

17. The illuminated guy rope system as claimed in claim 16, wherein the light source assembly comprises a proximity detector.

18. The illuminated guy rope system as claimed in claim 17, wherein the proximity detector comprises a passive infrared detector.

19. The illuminated guy rope system as claimed in claim 17, wherein the proximity detector comprises an ultrasonic detector.

20. The illuminated guy rope system as claimed in claim 13, wherein the light source assembly is configured for detecting motion of the light source assembly and illuminating the light source when motion is detected.

21. The illuminated guy rope system as claimed in claim 20, wherein the light source assembly comprises a motion sensor and wherein the light source assembly is configured for illuminating the light source when the motion sensor sensors motion.

22. The illuminated guy rope system as claimed in claim 21, wherein the motion sensor comprises an accelerometer.

23. The illuminated guy rope system as claimed in claim 1, wherein the optic interface comprises an entrance port.

24. The illuminated guy rope system as claimed in claim 23, wherein the light source assembly comprises an upper surface and a lower surface and wherein the port is located towards the upper surface.

25. The illuminated guy rope system as claimed in claim 23, further comprising a connector opposite the port and wherein the connector is located towards the upper surface.

26. The illuminated guy rope system as claimed in claim 23, wherein the optic interface comprises frictional engagement for engaging at least a portion of the guy rope assembly.

27. The illuminated guy rope system as claimed in claim 26, wherein the frictional engagement comprises teeth.

28. The illuminated guy rope system as claimed in claim 27, wherein the frictional engagement comprises teeth located within the port.

29. The illuminated guy rope system as claimed in claim 26, wherein the frictional engagement comprises transverse abutments adjacent the port.

30. The illuminated guy rope system as claimed in claim 29, wherein the transverse abutments comprise teeth.

31. The illuminated guy rope system as claimed in claim 1, wherein the terminal connector comprises a screw pier and mating screw.

32. The illuminated guy rope system as claimed in claim 23, further comprising a PCB engagement and wherein the PCB engagement is configured so as to locate the PCB such that a light source of the PCB faces and operably collocates with the optic interface.

33. The illuminated guy rope system as claimed in claim 32, wherein the optic interface comprises a light port for operably collocating with the light source of the PCB.

34. The illuminated guy rope system as claimed in claim 32, wherein the PCB engagement comprises a pair of vertical PCB slots.

* * * * *